US012644439B2

(12) United States Patent
Brown et al.

(10) Patent No.: US 12,644,439 B2
(45) Date of Patent: Jun. 2, 2026

(54) ACTUATOR ASSEMBLY

(71) Applicant: Cambridge Mechatronics Limited, Cambridge (GB)

(72) Inventors: Andrew Benjamin Simpson Brown, Cambridge (GB); James Howarth, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 0 days.

(21) Appl. No.: 18/853,516

(22) PCT Filed: Apr. 3, 2023

(86) PCT No.: PCT/GB2023/050884
§ 371 (c)(1),
(2) Date: Oct. 2, 2024

(87) PCT Pub. No.: WO2023/187426
PCT Pub. Date: Oct. 5, 2023

(65) Prior Publication Data
US 2025/0223949 A1 Jul. 10, 2025

(30) Foreign Application Priority Data
Apr. 2, 2022 (GB) ..................................... 2204843

(51) Int. Cl.
*F03G 7/06* (2006.01)
(52) U.S. Cl.
CPC ................................. *F03G 7/06143* (2021.08)
(58) Field of Classification Search
None
See application file for complete search history.

(56) References Cited

U.S. PATENT DOCUMENTS

2023/0296961 A1* 9/2023 Brown ..................... G03B 5/00
359/554

FOREIGN PATENT DOCUMENTS

GB 2598091 A 2/2022
WO 2021209766 A1 10/2021
(Continued)

OTHER PUBLICATIONS

International Search Report and Written Opinion for Application No. PCT/GB2023/050884 dated Jun. 9, 2023 (9 pages).
(Continued)

*Primary Examiner* — Shafiq Mian
(74) *Attorney, Agent, or Firm* — Van Hoven PC; Stefan D. Osterbur; Joshua Van Hoven

(57) ABSTRACT

An actuator assembly (10) comprises: a first part (1), wherein a first (z) axis is defined with reference to the first part (1) and the extent of the actuator assembly (10) along the first (z) axis is less than the extent of the actuator assembly (10) along any axis perpendicular to the first (z) axis; a second part (2) which is movable relative to the first part (1); a drive arrangement (3) configured to rotate the second part (2) about the first (z) axis and to rotate the second part (2) about a second (x) axis perpendicular to the first (z) axis; and a bearing arrangement (4) configured to allow rotation of the second part (2) about the first (z) and second (x) axes, to constrain rotation of the second part (2) about a third (y) axis, and to constrain movement of the second part (2) along the third (y) axis, wherein the third (y) axis is perpendicular to the first (z) and second (x) axes.

17 Claims, 4 Drawing Sheets

(56) References Cited

FOREIGN PATENT DOCUMENTS

| WO | 2021209767 A1 | 10/2021 | |
| WO | 2021209768 A1 | 10/2021 | |
| WO | WO-2021209770 A1 * | 10/2021 | ........... G02B 27/646 |

OTHER PUBLICATIONS

Search Report for Application No. GB2204843.3 dated Sep. 8, 2022 (3 pages).

* cited by examiner

ACTUATOR ASSEMBLY

CROSS-REFERENCE TO RELATED APPLICATIONS

This application is a national stage application under 35 U.S.C. 371 of International Application No. PCT/GB2023/050884, filed Apr. 3, 2023, which claims priority to GB Patent Application No. 2204843.3, filed Apr. 2, 2022, and the entire contents of each are hereby expressly incorporated by reference herein in their entireties for all purposes.

FIELD

The present application relates to an actuator assembly with a drive arrangement which may include a plurality of shape memory alloy (SMA) wires.

BACKGROUND

SMA actuators have various applications and, for example, can be used to provide optical image stabilisation (OIS) in compact cameras for smartphones and other electronic devices. For instance, WO 2011/104518 A1 describes an actuator with eight SMA wires which is able to rotate a camera module (including a set of lenses and an image sensor) about three perpendicular axes so as to provide OIS. WO 2021/209770 A1 describes an actuator with e.g. four SMA wires and a bearing arrangement which is able rotate a camera module about two axes perpendicular to a primary axis.

SUMMARY

According to a first aspect of the present invention, there is provided an actuator assembly comprising: a first part, wherein a first axis (e.g. z axis) is defined with reference to the first part and the extent of the actuator assembly along the first axis is less than the extent of the actuator assembly along any axis perpendicular to the first axis; a second part which is movable relative to the first part; a drive arrangement configured to rotate the second part about the first axis and to rotate the second part about a second axis (e.g. x axis) perpendicular to the first axis; and a bearing arrangement configured to allow rotation of the second part about the first and second axes, to constrain rotation of the second part about a third axis (e.g. y axis), and to constrain movement of the second part along the third axis, wherein the third axis is perpendicular to the first and second axes.

Thus, the actuator assembly is able to rotate a part about two (x, z) axes, while movement along (and rotation about) a third (y) axis is constrained. Hence, for example, the risk of unwanted contact between parts of the actuator assembly can be reduced.

Moreover, because movement along the third (y) axis is constrained by the bearing arrangement, the drive arrangement itself need not provide such a constraint (which may be beneficial e.g. where the drive arrangement comprises SMA wires lying in a plane perpendicular to the third axis, as described below).

Actuator assemblies for use in optical systems often have a shape in which their extent along one axis (e.g. their height) is less than that along the two other axes. Here, one of the (only) two axes about which rotation can be produced is the first (z) axis, and the extent of the actuator assembly along the first axis is less than the extent of the actuator assembly along any axis perpendicular to the first axis.

When the actuator assembly is used in certain optical systems, the first (z) axis may be defined with reference to an optical axis. Hence, according to a further aspect of the present invention, there is provided an optical system which comprises an actuator assembly comprising: a first part, wherein a first axis is defined with reference to the first part; a second part which is movable relative to the first part; a drive arrangement configured to rotate the second part about the first axis and to rotate the second part about a second (x) axis perpendicular to the first axis; and a bearing arrangement configured to allow rotation of the second part about the first and second axes, to constrain rotation of the second part about a third (y) axis, and to constrain movement of the second part along the third axis, wherein the third axis is perpendicular to the first and second axes. The optical system further comprises an optical component comprised in the first or second part. The first axis is defined so as to correspond to an optical axis of the optical component when the second part is in a particular position and orientation relative to the first part.

Constraints

Herein, 'constrain' may mean, for example, counteract, limit or prevent movement or rotation.

The second (x) and third (y) axes may rotate relative to the first part.

The bearing arrangement may be configured to constrain movement of the second part along the second (x) axis. The bearing arrangement may be configured to constrain movement of the second part along the first (z) axis. In other words, the bearing arrangement may be configured to constrain some or all of the translational movements of the second part.

The bearing arrangement may comprise two or more bearings, wherein the two or more bearings are spaced from each other along the second (x) axis and are each configured to constrain movement of the second part along the first (z) axis, such that the two or more bearings together constrain rotation of the second part about the third (y) axis. This may be a particularly convenient way of achieving these constraints.

The bearing arrangement may be configured to constrain movement of the second part in one direction along the first (z) axis. The actuator assembly may be configured to produce a biasing force on the second part that constrains movement of the second part in the other direction along the first axis. This may be a particularly convenient way of achieving this constraint.

Restoring Force

The bearing arrangement may be configured to produce a restoring force on the second part that tends to move the second part along the third (y) axis to a particular position along the third axis. The restoring force may also tend to rotate the second part about the first (z) axis to a particular orientation relative to the first axis.

The bearing arrangement may comprise one or more bearings, wherein each of the one or more bearings is between a first region of the first part and a second region of the second part, and, in each of the one or more bearings, when the second region moves in one direction along the third (y) axis away from a particular position relative to the first region, the bearing is configured to produce a force on the second part with a component in the other direction along the third axis. The bearing may be further configured to produce a force on the second part with a component in the one direction when the second region moves in the other direction along the third (y) axis away from the particular position. The actuator assembly may comprise two or more of these bearings, which may correspond to the above-described two or more bearings, i.e. these bearings may constrain, amongst other things, rotation about the third axis and movement along the third axis.

The one or more bearings may be configured to cause the second part to move in a first direction along the first (z) axis when the second part is moved along the third (y) axis away from the particular position. The actuator assembly may be configured to produce a biasing force on the second part with a component in a second direction along the first axis, wherein the second direction is opposite to the first direction, thereby producing the restoring force. The one or more bearings may be configured to cause the second part to move in the first direction when the second part is rotated about the first (z) axis away from the particular orientation.

The particular position may correspond to a central position. The one or more bearings may be configured to cause the second part to move in the first direction when the second part is translated in either direction along the third (y) axis. The particular orientation may correspond to a central orientation. The one or more bearings may be configured to cause the second part to move in the first direction when the second part is rotated in either sense about the first (z) axis.

Each of the one or more bearings may comprise: a track associated with one of the first and second parts; and a bearing element configured to move along the track. The track may extend along a path whose position along the first (z) axis varies so as to cause the second part to move in the first direction when the second part is moved along the third (y) axis away from the particular position. The position of the track along the first (z) axis may vary so as to cause the second part to move in the first direction when the second part is rotated about the first axis away from the particular orientation.

The bearing element may be a plain bearing element or a rolling bearing element (e.g. ball bearing).

Normal Force

The bearing arrangement may be configured to produce a normal force that constrains movement of the second part along the third (y) axis. The normal force may be produced by way of contact between features of the bearing arrangement.

The bearing arrangement may comprise a spherical bearing. The spherical bearing may be used in combination with the above-described two or more bearings, i.e. those bearings which constrain rotation about the third (y) axis.

The bearing arrangement may comprise two or more bearings each comprising: a track associated with one of the first and second parts; and a bearing element configured to move along the track. The track may extend along a path corresponding to part of a circle centred on the first (z) axis and lying in a plane perpendicular to the first axis such that the two or more bearings together guide rotation of the second part about the first axis and constraint movement of the second part along the third (y) axis.

Each of the two or more bearings may comprise a further track associated with the other one of the first and second parts. The bearing element may be configured to move along the further track.

These two or more bearings may correspond to the above-described two or more bearings, i.e. these bearings may constrain, amongst other things, rotation about the third (y) axis and movement along the third axis.

Drive Arrangement

The drive arrangement may be configured to produce the above-described biasing force. Alternatively or additionally, the actuator assembly may comprise a biasing arrangement configured to produce the biasing force.

The drive arrangement may comprise a plurality of SMA wires. The plurality of SMA wires may comprise four SMA wires connected between the first and second parts in an arrangement capable of rotating the second part about the first axis and/or second axis. The four SMA wires may comprise a first pair of SMA wires on a first side of the actuator assembly and a second pair of SMA wires on a second side of the actuator assembly opposite the first side. The first axis may be positioned between the first and second sides. Each of the four SMA wires may provide a force on the second part with a component in the same direction along the first axis. Within each pair, the SMA wires may cross when viewed along a direction perpendicular to the first axis. Each of the SMA wires may lie in a plane perpendicular to the third axis or may be inclined at an angle of e.g. less than 10° or less than 5° to such a plane. Each of the SMA wires may apply a force to the second part that lies in a plane perpendicular to the third axis or is inclined at an angle of e.g. less than 10° or less than 5° to such a plane.

Three-Part Actuator Assembly

The actuator assembly may further comprise: a third part which is movable relative to the second part, wherein a fourth (z2) axis is defined with reference to the second part; a further drive arrangement configured to rotate the third part about the fourth axis and to rotate the second part about a fifth (y2) axis perpendicular to the fourth axis; a further bearing arrangement configured to guide rotation of the third part about the fourth and fifth axes and to constrain movement of the third part along at least a sixth (x2) axis which is perpendicular to the fourth and fifth axes.

The first (z) and fourth (z2) axes may be parallel or collinear. At least when the second part is in a particular position relative to the first part and the third part is in a particular position relative to the second part, the fifth (y2) axis may extend in a perpendicular direction to the second (x) axis.

Hence, the actuator assembly is able to rotate a part about three perpendicular (z, y, z) axes. This is achieved in two stages wherein, at each stage, a part is rotated about two perpendicular axes.

The further drive arrangement may have any of the above-described features of the drive arrangement, and the further bearing arrangement may have any of the above-described features of the bearing arrangement.

Optical System

There may be provided an optical system comprising: the actuator assembly; and a component of the optical system comprised in the first, second or third part.

BRIEF DESCRIPTION OF THE DRAWINGS

Certain embodiments of the present invention will now be described, by way of example only, with reference to the accompanying drawings in which.

DETAILED DESCRIPTION

First Example of an Actuator Assembly

Figures 1, 2:
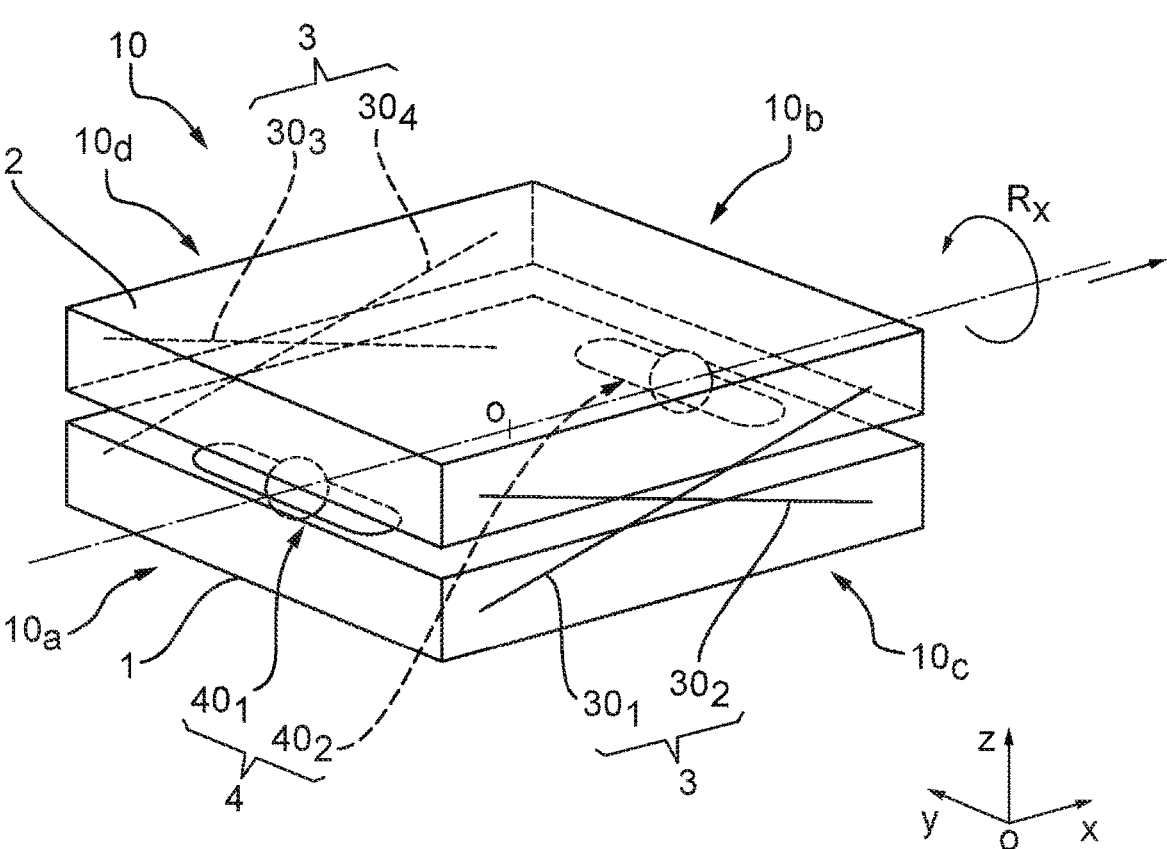
FIG. 1 is a schematic perspective view of a first example of an actuator assembly.
FIG. 2 is a schematic sectional view of one of the bearings of the actuator assembly of FIG. 1.

Referring to FIGS. 1 and 2, a first example of an actuator assembly 10 will now be described.

The actuator assembly 10 includes a first part 1 (hereinafter referred to as a base), a second part 2 (hereinafter referred to as a movable part), a drive arrangement 3 and a bearing arrangement 4.

A first axis (hereinafter referred to as the z axis) can be defined with reference to the base 1. Herein, the actuator assembly 10 is described as if the z axis is oriented vertically.

The extent of the actuator assembly 10 along the z axis (i.e. the height of the actuator assembly 10) is less than the extent of the actuator assembly along any axis perpendicular to the z axis (i.e. any horizontal dimension of the actuator assembly 10).

The base 1 has a generally planar shape which extends horizontally. Likewise, the movable part 2 has a generally planar shape which extends horizontally. The movable part 2 is positioned above the base 1 and is spaced from the base 1 by a vertical gap. The base 1 and the movable part 2 each have a generally square shape when viewed along the z axis (e.g. from above). In other examples, one or both of these parts 1, 2 may have different shapes and the parts 1,2 may be differently arranged. The parts 1, 2 may be formed of metal and/or plastic, for example.

As described below, the movable part 2 is movable relative to the base 1. The actuator assembly 10 can be said to be in a particular ('initial') configuration when the movable part 2 is in an initial position and orientation relative to the base 1. Such an initial configuration may be adopted when the drive arrangement 3 is in a particular state. The actuator assembly 10 is generally described herein in its initial configuration.

The bearing arrangement 4 includes a first bearing 40₁ and a second bearing 40₂. The first bearing 40₁ is located on a first side 10a of the actuator assembly 10 and the second bearing 40₁ is located on a second, opposite side 10b of the actuator assembly 10.

Referring to FIG. 2, each bearing 40 includes a track 40a on the upper surface of the base 1 and a ball bearing element 40b. The track 40a may be an integral part of (e.g. a feature of the surface of) the base 1 or may be a separate part which is affixed to the base 1. The track 40a has a cross section which is shaped so as to receive part of the ball bearing element 40b. For example, each track 40a may have a curved or V-shaped cross section (cf. FIGS. 5C, 5D). The ball bearing element 40b may be made of metal or ceramic, for example. The ball bearing element 40b sits partly within the track 40a. The ball bearing element 40b is urged into contact with the track 40a and the lower surface 2a of the movable part 2 by the biasing force produced by the actuator assembly 10 (described below). The ball bearing element 40b can move (e.g. roll) along the track 40a and the lower surface 2a of the movable part 2.

A second axis (hereinafter referred to as the x axis) can be defined as being perpendicular to the z axis, and a third axis (hereinafter referred to as the y axis) can be defined as being perpendicular to the x and z axes. In this example, the x axis passes through the centres of the two ball bearing elements 40b₁, 40b₂ and the (x and) y and z axes pass through a point (i.e. the origin O) midway between the centres of the two ball bearing elements 40b₁, 40b₂.

Each of the two tracks 40a₁, 40a₂ extend along a path which, when viewed along the z axis (e.g. from above), extends in the y direction.

The ball bearing elements 40b₁, 40b₂ are positioned between the base 1 and the movable part 2 so as to constrain downwards movement of the movable part 2 towards the base 1. In addition, as explained below, the actuator assembly 10 is configured to produce a biasing force on the movable part 2 which constrains upwards movement of the movable part 2 away from the base 1. In this way, movement of the movable part 2 in the z direction is constrained.

In this example, the bearing arrangement 4 does not (fully) constrain movement of the movable part 2 in the x direction. In other examples, the bearing arrangement 4 may provide such a constraint, e.g. with resilient elements (flexures) connected between the base 1 and the moving part 2.

Because the two ball bearing elements 40b₁, 40b₂ are spaced from each along the x axis, they together constrain rotation of the movable part 2 about the y axis.

The two bearings 40₁, 40₂ allow the movable part 2 to rotate about the x axis, e.g. by changing the points of contact between the movable part 2 and the two ball bearing elements 40b₁, 40b₂. Such a rotation Rx is illustrated in FIG. 1.

The two bearings 40₁, 40₂ allow the movable part 2 to rotate about the z axis. In particular, when the movable part 2 rotates about the z axis, the ball bearing elements 40b₁, 40b₂ roll along their tracks 40a, 40b and along the lower surface 2a of the movable part 2. For example, when the movable part 2 rotates in a clockwise sense about the z axis, the ball bearing element 40b₁ of the first bearing 40₁ rolls in a positive y direction along its track 40a, and the ball bearing element 40b₂ of the second bearing 40₂ rolls in a negative y direction along its track 40a.

In the absence of any further features—for example if each of the two tracks 40a (and the surface 2a of the movable part 2 in the region of the bearing 40) were horizontal—then the bearing arrangement 4 would allow the movable part to move freely along the y axis. This would increase the risk of unwanted contact between parts of the actuator assembly 10 and/or of the device in which the actuator assembly 10 is included.

To address this issue, the bearing arrangement 4 is configured to produce a restoring force on the movable part 2 that tends to move the movable part 2 in the y direction to a particular position along the y axis (i.e. the initial position) and also tends to rotate the movable part 2 about the z axis to a particular orientation relative to the z axis (i.e. the initial orientation).

More specifically, in each bearing 40, the track 40a extends along a path whose position along the z axis (i.e. height) varies so as to cause the movable part 2 to move upwards away from base 1 when the movable part 2 is moved in either direction along the y axis away from the initial position. In particular, the track 40a has a lowest point in which the ball bearing element 40b sits when the movable part 2 is in its initial position and orientation, and the track 40a slopes upwards from this lowest point as it extends in the +y and −y directions. The upwards-sloping portions of the track $40a$ (i.e. "slopes") may be straight (as illustrated in FIG. 2) and/or curved. Accordingly, movement of the movable part 2 in the +y or −y direction away from the initial position causes each ball bearing element $40b$ to roll in the same direction up a slope, causing the movable part 2 to move upwards. As will be appreciated, rotation of the movable part 2 about the z axis away from the initial orientation has the same effect, although with the ball bearing elements $40b_1$, $40b_2$ rolling in different directions.

As explained below, the actuator assembly 10 is configured to produce a downwards biasing force on the movable part 2, which acts against the upwards movement produced by the bearing arrangement 3, thereby producing the restoring force that tends to move the movable part 2 to its initial position and orientation.

In this way, the actuator assembly 2 is able to constrain movement of the movable part 2 in the sense of being able to limit movement of the movable part 2 away from its initial position and orientation and/or return the movable part 2 to its initial position and orientation after e.g. a shock event or after being moved by the drive arrangement 3.

The drive arrangement 3 includes four SMA wires $30_1$-$30_4$. Each SMA wire 30 is connected between the movable part 2 and the base 1. In particular, one end of each SMA wire 30 is connected by way of a connector such as a crimp (not shown) to the movable part 2, and the other end of each SMA wire 30 is connected by way of a similar connector (not shown) to the base 1. Each SMA wire 30 provides a downwards force on the movable part 2 when the SMA wire 30 is in tension. A first pair of SMA wires $30_1$, $30_2$ are located on a third side $10c$ of the actuator assembly 10, and a second pair of SMA wires $30_3$, $30_4$ are located on a fourth, opposite side $10d$ of the actuator assembly 10. The third and fourth sides $10c$, $10d$ are spaced from each other along the y axis, and are on either side of the z axis. The first pair of SMA wires $30_1$, $30_2$ lie approximately in a first plane parallel to the zx plane, and the second pair of SMA wires $30_3$, $30_4$ lie approximately in a second plane parallel to the zx plane. Within each pair, the SMA wires 30 cross when viewed along the y axis.

Each SMA wire 30 can be actuated by passing an electrical ('drive') current through the SMA wire 30 and thus resistively heating it. Herein, 'actuated' means changing the force applied to the movable part 2 by the SMA wire 30 and/or changing the length of the SMA wire 30. The drive currents are supplied to the SMA wires 30 by control circuitry (not shown).

The drive arrangement 3 may be the same as or similar to one half of the drive arrangement of FIG. 1 of WO 2011/104518 A1 (which is incorporated by reference to the maximum extent permissible by law).

The first pair of SMA wires $30_1$, $30_2$ may be actuated so as to produce a first, downwards force on the first side $10a$ of movable part 2. The second pair of SMA wires $30_3$, $30_4$ may be actuated so as to produce a second, downwards force on the second side of the movable part 2.

When the first and second forces are suitably balanced (e.g. equal), the movable part 2 may be held e.g. in its initial position and orientation against the bearing arrangement 4. In this way, the drive arrangement 3 is able to produce the above-described downwards biasing force. In some examples, the actuator assembly 10 may include an additional or alternative biasing arrangement configured to produce the biasing force. This biasing arrangement may include, for example, one or more resilient members connected between the base 1 and the movable part 2 (e.g. as described in WO2017/072525, which is incorporated by reference to the maximum extent permissible by law), magnetically interacting parts in the base 1 and the movable part 2, etc.

When the first and second forces are unbalanced (e.g. different), the movable part 2 rotates about the x axis in one sense or another depending on which of the first and second forces are greater. Such a rotation is labelled Rx in FIG. 1.

The first and third SMA wires $30_1$, $30_3$ may be actuated so as to produce (among other things) a first torque on the movable part 2 in a clockwise sense about the z axis. The second and fourth SMA wires $30_2$, $30_4$ may be actuated so as to produce (among other things) a second torque on the movable part 2 in an anticlockwise sense about the z axis. When the first and second torques are unbalanced (e.g. different), the movable part 2 rotates about the z axis in one sense or another depending on which of the first and second torques are greater.

Rotation of the movable part 2 about the z axis and (simultaneously) about the x axis can be produced by a combination of the above-described actuations.

It will be appreciated that rotation of the movable part 2 about the z axis may cause the ball bearing elements $40b$ to move such that the x and y axes (as defined) also rotate about the z axis.

It will be appreciated that the drive arrangement 3 is not specifically configured to control the position of the movable part 2 along the y axis. Hence the ability of the bearing arrangement 4 to constrain movement in the y direction can be particularly useful.

Second Example of an Actuator Assembly

Figure 3:
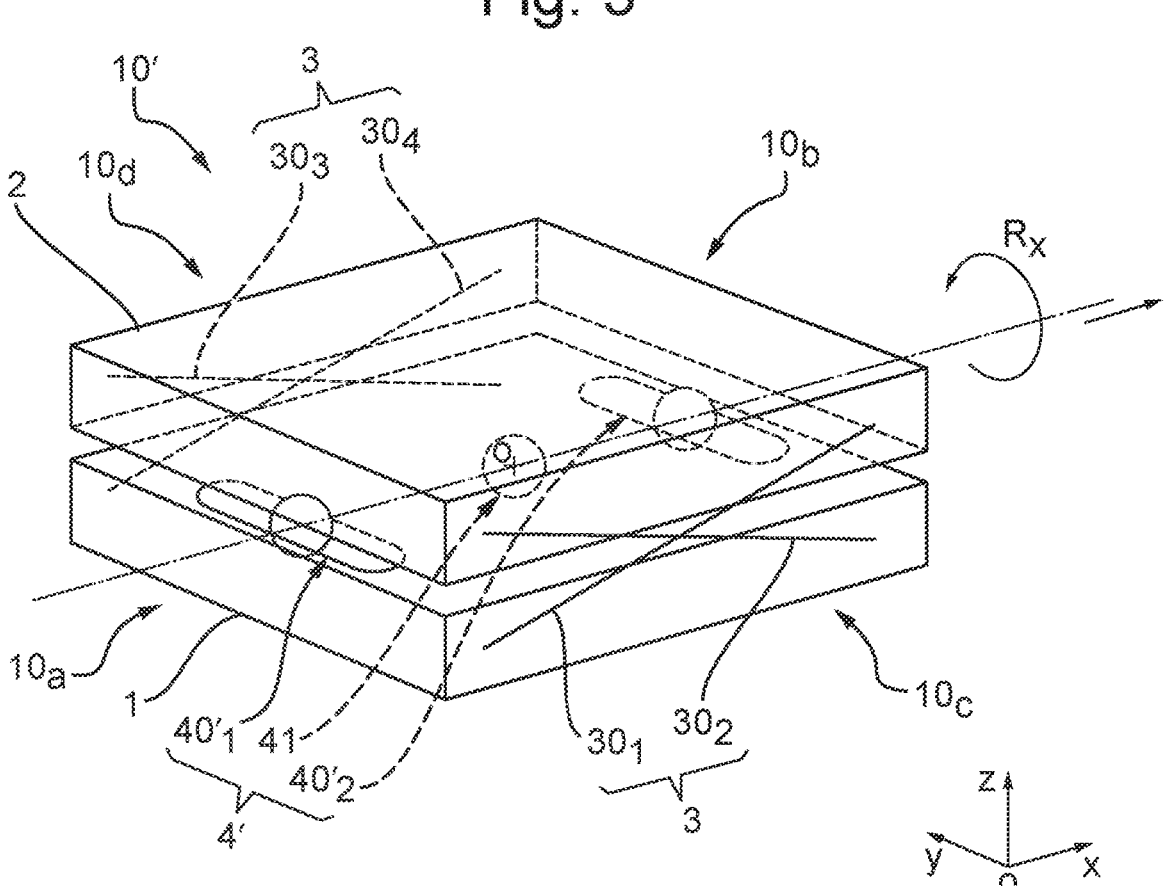
FIG. 3 is a schematic perspective view of a second example of an actuator assembly.
Figure 4:
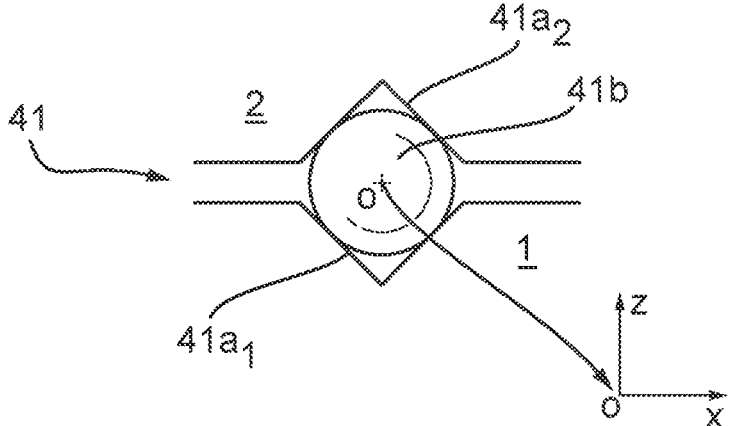
FIG. 4 is a schematic sectional view of one of the bearings of the actuator assembly of FIG. 3.

Referring to FIGS. 3 and 4, a second example of an actuator assembly 10' will now be described.

The actuator assembly 10' is the same as in the first example except that it has a different bearing arrangement 4'.

The bearing arrangement 4' includes two bearings 40' of a first type (hereinafter referred to as side bearings) and a bearing 41 of a second type (hereinafter referred to as a centre bearing).

The two side bearings 40' are the same as the two bearings 40 in the first example except that their tracks $40a$ do not (necessarily) have slopes, i.e. they are horizontal. Hence the side bearings 40' allow the movable part 2 to move more freely along the y axis. Otherwise, the side bearings 40' constrain and allow (guide) the same movements and rotations as the bearings 40 in the first example.

The centre bearing 41 is a spherical bearing which allows rotation of the movable part 2 about the x, y and/or z axes.

In particular, referred to FIG. 4, the centre bearing 41 includes a first recess $41a_1$ on the upper surface of the base 1, a second recess $41a_2$ on the lower surface of the movable part 2, and a ball bearing element $41b$. The ball bearing element $41b$ is centred at the point (i.e. the origin O) at which the x, y and z axes cross. The ball bearing element $41b$ may be made of metal or ceramic, for example. Each recess $41a$ may be an integral part of (e.g. a feature of the surface of) the base 1 or the movable part 2, or each recess $41a$ may be a separate part which is affixed to the base 1 or the movable part 2. Each recess $41a$, has a cross section which is shaped so as to receive part of the ball bearing element $41b$. For example, each recess $41a$ may have a conical shape (as illustrated in FIG. 4) or a part-spherical shape. The ball bearing element $41b$ is urged into contact with the recesses $41a_1$, $41a_2$ by the biasing force produced e.g. by the drive arrangement 3 (as described above in relation to the first example). The ball bearing element 41$b$ can only rotate withing each recess 41$a$.

Hence, while allowing the rotation of the movable part 2 about the x, y and/or z axes, the centre bearing 41 constrains movement along the x, y and z axes. This is due to the normal forces produced within the bearing 41.

Due to the combination of the side bearings 40' and the centre bearing 41, the bearing arrangement 4' provides the same general constraints as the bearing arrangement 4 in the first example. In particular, the bearing arrangement 4' constrains movement along the y axis (due to the centre bearing 41), constrains movement along the z axis (due to the side bearings 40' and the centre bearing 41) and constrains rotation about the y axis (due to the side bearings 40'). In addition, the bearing arrangement 4' constrains movement along the x axis (due to the centre bearing 41).

Third Example

Referring to FIG. 5, a third example of an actuator assembly 10" will now be described.

The actuator assembly 10" is the same as in the first example (including in relation to the drive arrangement 3, which is omitted from FIG. 5) except that the actuator assembly 10" has a different bearing arrangement 4".

The bearing arrangement 4" includes first and second bearings 42$_1$, 42$_2$. The first bearing 42$_1$ is located on the first side 10$a$ of the actuator assembly 10", and the second bearing 42$_2$ is located on the second, opposite side 10$b$ of the actuator assembly 10".

Each bearing 42 includes a first track 42$a$ on the upper surface of the base 1, a second track 42$c$ on the lower surface of the movable part 2, and a ball bearing element 42$b$.

Figure 5A:
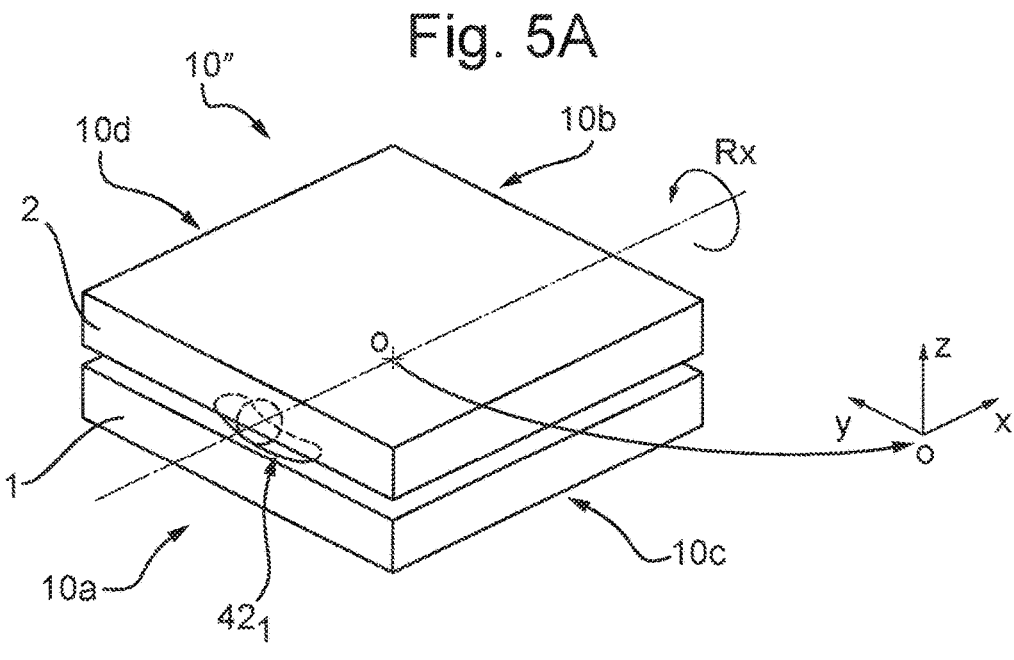
FIG. 5A is a schematic perspective view of a third example of an actuator assembly.
Figure 5B:
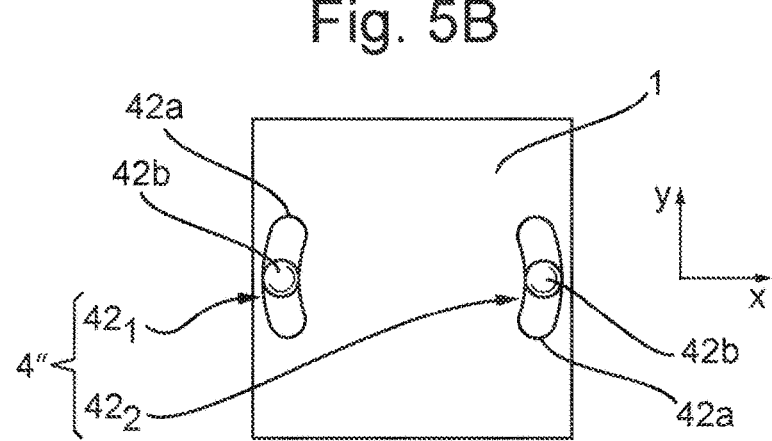
FIG. 5B is a schematic plan view of the base of the actuator assembly of FIG. 5A.
Figure 5C:
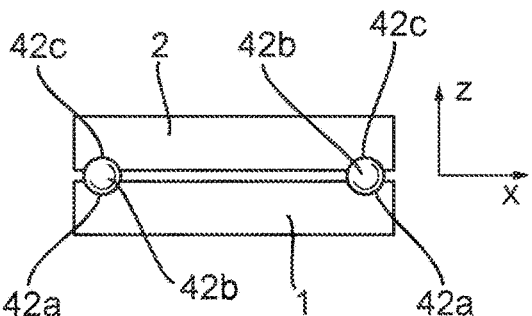
FIG. 5C is a schematic sectional view of the actuator assembly of FIG. 5A.
Figure 5D:
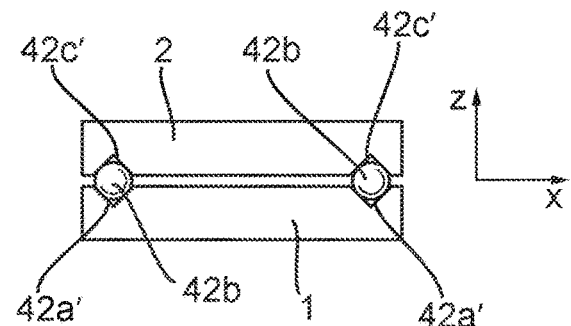
FIG. 5D is a schematic sectional view of a variation of the actuator assembly of FIG. 5A.

Each track 42$a$, 42$c$ may be an integral part of (e.g. a feature of the surface of) the base 1 or the movable part 2, or each track 42$a$, 42$c$ may be a separate part which is affixed to the base 1 or the movable part 2. Each track 42$a$, 42$c$ has a cross section which is shaped so as to receive part of the ball bearing element 42$b$. For example, each track 42$a$, 42$c$ may have a curved cross section (as illustrated in FIG. 5C) or each track 42$a'$, 42$c'$ may have a V-shaped cross section (as illustrated in FIG. 5D). The ball bearing element 42$b$ may be made of metal or ceramic, for example. The ball bearing element 42$b$ is urged into contact with the tracks 42$a$, 42$c$ by the biasing force produced e.g. by the drive arrangement (not shown). The ball bearing element 42$b$ can move (e.g. roll) along the tracks 42$a$, 42$c$.

Each of the track 42$a_1$, 42$a_2$, 42$c_1$, 42$c_2$ extends along a path which lies in a plane parallel to the xy plane (i.e. a horizontal plane). Furthermore, each of the tracks 42$a_1$, 42$a_2$, 42$c_1$, 42$c_2$ extends along a path which, when viewed along the z axis (e.g. from above), correspond to part of a circle centred on the z axis.

Therefore, the two bearings 42$_1$, 42$_2$ together allow (guide) rotation of the movable part 2 about the z axis, while constraining movement of the movable part 2 along the y axis. In the case of the latter, this is due to normal forces produced between the ball bearing elements 42$b_1$, 42$b_2$ and (the sides of) the tracks 42$a_1$, 42$a_2$, 42$c_1$, 42$c_2$. Similarly, the bearings 42$_1$, 42$_2$ constrain movement of the movable part 2 along the x axis.

Like in the first example, the ball bearing elements 42$b_1$, 42$b_2$ are positioned between the base 1 and the movable part 2 so as to constrain downwards movement of the movable part 2 towards the base 1, while the biasing force produced by the actuator assembly 10" constrains upwards movement of the movable part 2 away from the base 1. Also like in the first example, the two ball bearing elements 42$b_1$, 42$b_2$ are spaced from each along the x axis and, therefore, they together constrain rotation of the movable part 2 about the y axis. Also like the first example, the bearings 42$_1$, 42$_2$ allow the movable part 2 to rotate about the x axis (Rx).

Fourth Example

Figure 6:
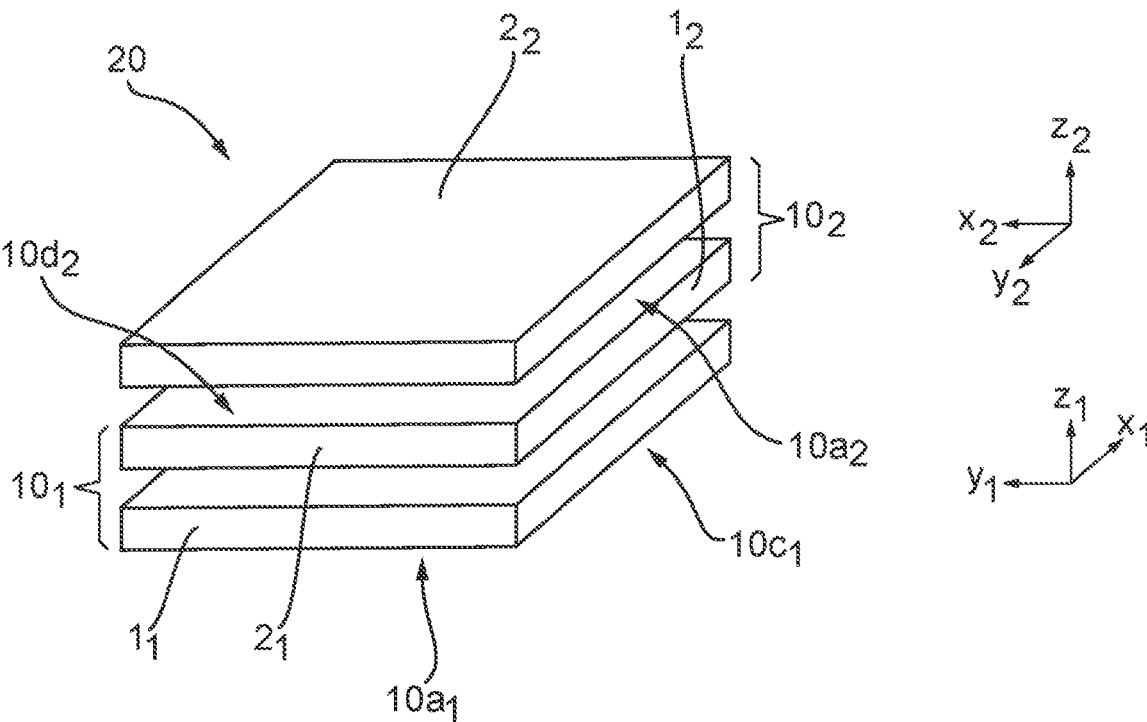
FIG. 6 is a schematic perspective view of a fourth example of an actuator assembly.

Referring to FIG. 6, a fourth example of an actuator assembly 20 will now be described.

The actuator assembly 20 corresponds to two of the above-described actuator assemblies, hereinafter referred to as a lower assembly 10$_1$ and an upper assembly 10$_2$.

The movable part 2$_1$ of the lower assembly 10$_1$ corresponds to the base 1 of the upper assembly 10$_2$. For example, the movable part 2$_1$ of the lower assembly 10$_1$ and the base 1$_1$ of the upper assembly 10$_2$ may be one and the same part, or they may be affixed to each other. Otherwise, the parts 1$_1$, 1$_2$, 2$_1$, 2$_2$ may have any suitable shapes and arrangements (e.g. they may be "nested" and/or "stacked").

When both the upper and lower assemblies 10$_1$, 10$_2$ are in their initial configurations, the z axis defined with reference to the base 1$_1$ of the lower assembly 10$_1$ (the z1 axis) and the z axis defined with reference to the base 1$_2$ of the upper assembly 10$_2$ (the z2 axis) are collinear. In addition, when both the upper and lower assemblies 10$_1$, 10$_2$ are in their initial configurations, the x and y axes associated with the upper assembly 10$_2$ (the x2 and y2 axes) are at an angle of 90° relative to the x and y axes associated with the lower assembly 10$_1$ (the x1 and y2 axes). Therefore, for example, the first side 10$a_2$ of the upper assembly 10$_2$ is aligned with the third side 10$c_1$ of the lower assembly 10$_1$, while the fourth side 10$d_2$ of the upper assembly 10$_2$ is aligned with the first side 10$a_1$ of the lower assembly 10$_1$. Therefore, the actuator assembly 20 is able to rotate the movable part 2$_2$ about three perpendicular axes or, in other words, with three rotational degrees of freedom. This is achieved in two stages wherein, at each stage, a part is rotated about two perpendicular axes (i.e. x1 and z1 and then x2 and z2).

Optical System

Any of the above-described actuator assemblies may be used in an optical system to move a component of such a system.

For example, the actuator assembly may be used in a camera for a smartphone or other electronic device. The actuator assembly may be for moving a module including a set of lenses and an image sensor about two or three axes so as to provide OIS. In a typical such system, the module (especially the image sensor) is electrically connected to the base and/or to the device by a suitable electrical interconnector which may include flexible printed circuit(s) and/or flexures.

The actuator assembly may be used to move at least part of an illumination source in a 3D imaging system such as described in WO2020/030916 (which is incorporated by reference to the maximum extent permissible by law).

The actuator assembly may be used to move at least part of a light source (e.g. a projector), a display or one or more other optical components of a display system for an augmented reality (AR) system or other electronic device.

When the actuator assembly is used in such a system, the z axis may be defined with reference to an optical axis of the system. For example, in relation to the above-described camera, the z axis may be defined as corresponding to the optical axis of the set of lenses when the movable part (i.e. the module) is in its initial (e.g. central) position and orientation. In such a case, the height of the actuator assembly need not be less than any horizontal dimension of the actuator assembly.

Other Variations

It will be appreciated that there may be many other variations of the above-described examples.

For example, the drive arrangement 3 may include a different number of SMA wires and/or a different arrangement of SMA wires. For example, the drive arrangement 3 could include eight SMA wires with any suitable arrangement described in WO 2011/104518 A1. The drive arrangement 3 could include four SMA wires with any suitable arrangement described in WO 2021/209770 A1 or WO 2020074899 A1 (which is incorporated by reference to the maximum extent permissible by law).

The SMA wires need not be directly connected between the first and second parts and may instead be indirectly connected via one or more intermediate components. For example, each SMA wire may form part of an actuating unit comprising a force-modifying mechanism connected to one of the first and second parts; a coupling link connected between the force-modifying mechanism and the other of the first and second parts; and an SMA wire connected between the one of the first and second parts and the force-modifying mechanism, as described in WO 2022/084699 A1 (which is incorporated by reference to the maximum extent permissible by law).

The drive arrangement 3 need not include SMA wires and may include a different type of actuating element such as a voice coil motor or piezoelectric material.

Instead of a ball bearing element 40*b*, 41*b*, 42*c*, any bearing 40, 40', 41, 42 may include a different type of bearing element, for example a different type of rolling bearing element or a plain bearing element.

In the latter case, such a bearing may comprise a protrusion (e.g. with a part-spherically-shaped end) on the movable part 2 configured to slidably engage with a track (the same as or similar to track 40*a* or track 42*a*) or a recess (the same as or similar to recess 41*a*) on the base 1.

Any of the tracks or recesses may be provided on the movable part 2 rather than on the base 1.

The bearing arrangement 4, 4', 4" may include more than two bearings 40, 40', 40" spaced along the x axis.

In the bearing arrangement 4 of the first example actuator assembly 10, each bearing 40 is between a first region of the base 1 and a second region of the movable part 2. In each bearing 40, when the second region moves in one direction along the y axis, the bearing 40 produce a force on the movable part 2 with a component in the other direction along the y axis. Rather than being produced as described above, this force can be produced in any suitable way. For example, the force can be produced by way of one or more resilient members connected between the base 1 and the movable part 2, magnetically interacting parts in the base 1 and the movable part 2, etc.

In the bearing arrangement 4' of the second example actuator assembly 10', the side bearings 40' may be omitted. However, in this case, the bearing arrangement 4' would not constrain rotation of the movable part 2 about the y axis and so an addition means for constraining such rotation may be included.

The relative orientation of the upper and lower assemblies 10₁, 10₂ in the fourth example actuator assembly 20 may differ, while still allowing the three rotational degrees of freedom.

Instead of the extent of the actuator assembly along the first axis being less than the extent of the actuator assembly along any axis perpendicular to the first axis, the axes may be defined with reference to the drive arrangement comprising a plurality of SMA wires and each SMA wire lying substantially in a plane perpendicular to the third axis.

SMA Wire

The above-described SMA actuator assemblies comprise an SMA wire. The term 'shape memory alloy (SMA) wire' may refer to any element comprising SMA. The SMA wire may have any shape that is suitable for the purposes described herein. The SMA wire may be elongate and may have a round cross section or any other shape cross section. The cross section may vary along the length of the SMA wire. It is also possible that the length of the SMA wire (however defined) may be similar to one or more of its other dimensions. The SMA wire may be pliant or, in other words, flexible. In some examples, when connected in a straight line between two elements, the SMA wire can apply only a tensile force which urges the two elements together. In other examples, the SMA wire may be bent around an element and can apply a force to the element as the SMA wire tends to straighten under tension. The SMA wire may be beam-like or rigid and may be able to apply different (e.g. non-tensile) forces to elements. The SMA wire may or may not include material(s) and/or component(s) that are not SMA. For example, the SMA wire may comprise a core of SMA and a coating of non-SMA material. Unless the context requires otherwise, the term 'SMA wire' may refer to any configuration of SMA wire acting as a single actuating element which, for example, can be individually controlled to produce a force on an element. For example, the SMA wire may comprise two or more portions of SMA wire that are arranged mechanically in parallel and/or in series. In some arrangements, the SMA wire may be part of a larger piece of SMA wire. Such a larger piece of SMA wire might comprise two or more parts that are individually controllable, thereby forming two or more SMA wires.

The invention claimed is:

1. An actuator assembly comprising:
   a first part, wherein a first axis is defined with reference to the first part and the extent of the actuator assembly along the first axis is less than the extent of the actuator assembly along any axis perpendicular to the first axis;
   a second part which is movable relative to the first part;
   a drive arrangement configured to rotate the second part about the first axis and to rotate the second part about a second axis perpendicular to the first axis; and
   a bearing arrangement configured to allow rotation of the second part about the first and second axes, to constrain rotation of the second part about a third axis, and to constrain movement of the second part along the third axis, wherein the third axis is perpendicular to the first and second axes;
   wherein the bearing arrangement is configured to constrain movement of the second part in a first direction along the first axis; and
   the actuator assembly is configured to produce a biasing force on the second part that constrains movement of the second part in a second direction along the first axis, wherein the second direction is opposite the first direction.

2. An actuator assembly according to claim 1 wherein the bearing arrangement is configured to constrain movement of the second part along the second axis.

3. An actuator assembly according to claim 1 wherein the bearing arrangement comprises two or more bearings, wherein the two or more bearings are spaced from each other along the second axis and are each configured to constrain movement of the second part along the first axis, such that the two or more bearings together constrain rotation of the second part about the third axis.

4. An actuator assembly according to claim 1 wherein the bearing arrangement is configured to produce a restoring force on the second part that tends to move the second part along the third axis to a particular position along the third axis.

5. An actuator assembly according to claim 4 wherein the bearing arrangement comprises one or more bearings, wherein each of the one or more bearings is between a first region of the first part and a second region of the second part, and, in each of the one or more bearings, when the second region moves in one direction along the third axis away from a particular position relative to the first region, the bearing is configured to produce a force on the second part with a component in the other direction along the third axis.

6. An actuator assembly according to claim 5 wherein:
   the one or more bearings are configured to cause the second part to move in the first direction along the first axis when the second part is moved along the third axis away from the particular position; and
   the actuator assembly is configured to produce a biasing force on the second part with a component in the second direction along the first axis, wherein the second direction is opposite to the first direction, thereby producing the restoring force.

7. An actuator assembly according to claim 6 wherein each of the one or more bearings comprises:
   a track associated with one of the first and second parts; and
   a bearing element configured to move along the track;
   wherein the track extends along a path whose position along the first axis varies so as to cause the second part to move in the first direction when the second part is moved along the third axis away from the particular position.

8. An actuator assembly according to claim 1 wherein the bearing arrangement comprises a spherical bearing.

9. An actuator assembly according to claim 1 wherein the bearing arrangement comprises two or more bearings each comprising:
   a track associated with one of the first and second parts; and
   a bearing element configured to move along the track;
   wherein the track extends along a path corresponding to part of a circle centred on the first axis and lying in a plane perpendicular to the first axis such that the two or more bearings together guide rotation of the second part about the first axis and constraint movement of the second part along the third axis.

10. An actuator assembly according to claim 1 wherein the drive arrangement is configured to produce the biasing force.

11. An actuator assembly according to claim 1 wherein the drive arrangement comprises a plurality of SMA wires.

12. An actuator assembly according to claim 11 wherein each SMA wire lies substantially in a plane perpendicular to the third axis.

13. An actuator assembly according to claim 1 further comprising:
   a third part which is movable relative to the second part, wherein a fourth axis is defined with reference to the second part;
   a further drive arrangement configured to rotate the third part about the fourth axis and to rotate the second part about a fifth axis perpendicular to the fourth axis;
   a further bearing arrangement configured to guide rotation of the third part about the fourth and fifth axes and to constrain movement of the third part along at least a sixth axis which is perpendicular to the fourth and fifth axes.

14. An actuator assembly according to claim 13 wherein, at least when the second part is in a particular position relative to the first part and the third part is in a particular position relative to the second part, the first and fourth axes are parallel or collinear and/or the fifth axis extends in a perpendicular direction to the second axis.

15. An optical system comprising:
   an actuator assembly according to claim 1; and
   a component of the optical system comprised in the first or second part.

16. An optical system according to claim 15, wherein the actuator assembly further comprises a third part which is movable relative to the second part, and the component of the optical system is comprised in the first, second or third part.

17. An actuator assembly comprising:
   a first part, wherein a first axis is defined with reference to the first part and the extent of the actuator assembly along the first axis is less than the extent of the actuator assembly along any axis perpendicular to the first axis;
   a second part which is movable relative to the first part;
   a drive arrangement configured to rotate the second part about the first axis and to rotate the second part about a second axis perpendicular to the first axis; and
   a bearing arrangement configured to allow rotation of the second part about the first and second axes, to constrain rotation of the second part about a third axis, and to constrain movement of the second part along the third axis, wherein the third axis is perpendicular to the first and second axes;
   wherein the drive arrangement comprises a plurality of SMA wires; and
   wherein each SMA wire lies substantially in a plane perpendicular to the third axis.

* * * * *